US007472595B2

(12) United States Patent
Ploix

(10) Patent No.: US 7,472,595 B2
(45) Date of Patent: Jan. 6, 2009

(54) DEVICE FOR MIXING AT LEAST TWO COMPONENTS

(75) Inventor: Dominique Ploix, Paris (FR)

(73) Assignee: L'Oreal, Paris (FR)

( * ) Notice: Subject to any disclaimer, the term of this patent is extended or adjusted under 35 U.S.C. 154(b) by 616 days.

(21) Appl. No.: 11/136,427

(22) Filed: May 25, 2005

(65) Prior Publication Data

US 2005/0263204 A1 Dec. 1, 2005

Related U.S. Application Data

(60) Provisional application No. 60/577,170, filed on Jun. 7, 2004.

(30) Foreign Application Priority Data

May 26, 2004 (FR) .................................. 04 51033

(51) Int. Cl.
*G01F 19/00* (2006.01)

(52) U.S. Cl. ........................................................ 73/426

(58) Field of Classification Search ................... 73/426; 206/459, 110; 366/205
See application file for complete search history.

(56) References Cited

U.S. PATENT DOCUMENTS

| | | | | |
|---|---|---|---|---|
| 4,001,444 | A * | 1/1977 | Clarke | 426/110 |
| 5,491,895 | A * | 2/1996 | Lee | 30/125 |
| 2003/0192911 | A1 | 10/2003 | Jacobs et al. | |
| 2004/0004017 | A1* | 1/2004 | Schmitt | 206/459.5 |
| 2004/0089316 | A1 | 5/2004 | Hamilton et al. | |
| 2006/0198241 | A1* | 9/2006 | Krishnachaitanya et al. | 366/205 |

FOREIGN PATENT DOCUMENTS

| | | | |
|---|---|---|---|
| DE | 77 14 613 | U | 1/1978 |
| DE | 39 15 203 | A1 | 12/1989 |
| EP | 0 918 023 | A1 | 5/1999 |
| NL | 7 214 910 | A1 | 5/1974 |

* cited by examiner

*Primary Examiner*—Jewel Thompson
(74) *Attorney, Agent, or Firm*—Oliff & Berridge, PLC

(57) ABSTRACT

The present invention relates to a device for mixing at least two components, the device comprising a bowl for receiving the components; and a measuring member including at least one mark useful for measuring purposes, the measuring member being releasably fastenable to the bowl.

48 Claims, 2 Drawing Sheets

DEVICE FOR MIXING AT LEAST TWO COMPONENTS

CROSS-REFERENCE TO RELATED APPLICATIONS

This non-provisional application claims the benefit of French Application No. 04 51033 filed on May 26, 2004 and U.S. Provisional Application No. 60/577,170 filed on Jun. 7, 2004.

The present invention relates to a device for mixing at least two components, for example, two components of a hair treatment composition, for example, a dye or permanent-wave composition for the hair.

BACKGROUND

A device for extemporaneously mixing together two substances is described in EP 0 918 023. The device described thereby comprises a bowl and separator means inside the bowl, which means may be retracted into the stand of the bowl by a helical drive mechanism. That device is of relatively complex structure.

SUMMARY

The invention seeks to provide a device of relatively simple structure that is practical to use, enabling components to be mixed together in a bowl that may be placed, for example, in a support on a stand that enables the bowl to be held at hand-height for a hairdresser.

Exemplary embodiments of the invention may provide a device for mixing at least two components, the device comprising: a bowl for receiving the components; and a measuring member including at least one measuring mark, for example, graduations, the measuring member being releasably fastenable to the bowl.

In exemplary embodiments, the measuring member may comprise a partition that, when removably fastened to the bowl, may be arranged to form at least two compartments inside the bowl. The partition may advantageously be graduated. For example, the partition may include graduations associated with each of the compartments. The graduations may comprise numerals. The numerals may increase in a regular manner, for example, being multiples of a base figure. The graduations may be continuous.

According to exemplary embodiments, a hairdresser may use the bowl to measure directly various compositions that are to be mixed together, while remaining standing and without any need to extract the bowl from its support on the stand to observe any lateral graduations of the kind to be found in measuring flasks.

In exemplary embodiments in which the measuring member includes a partition, the compartments formed thereby may each be of a section smaller than that of the bowl without the partition, thus increasing the accuracy with which the components are measured.

Exemplary embodiments also make it possible to avoid soiling intermediate receptacles for use in measuring substances that are to be mixed together, and may make it simpler to package said substances, for example, the bowl being reusable.

In exemplary embodiments the partition may advantageously be transparent, thus making it easier to read a level of a substance in one of the compartments.

In exemplary embodiments, the device may usefully further include a spoon, which may be transparent. The bowl may include a tongue suitable for wiping the spoon. The tongue may point upward, and may preferably also point inward so as to reduce any risk of substance being splashed away from the bowl.

A cross-section of an inside profile of the spoon may preferably match a shape of the tongue.

For example, the tongue may be secured to an inside surface of the bowl, at a top thereof. The tongue may include a face that faces the partition.

In exemplary embodiments, the two compartments defined by the partition may preferably be unequal. For example, a volume of one of the compartments may lie in a range of about 1.5 to about 2.5 times a volume of the other compartment. For example, the volume of one of the compartments may be about twice the volume of the other compartment.

In embodiments with unequal compartments, the tongue may be advantageously situated in a larger one of the compartments, thus making it easier to handle the spoon.

In exemplary embodiments, the bowl and the measuring member may include portions in relief that co-operate. For example, the bowl may include two notches and the measuring member may include two corresponding lugs arranged to engage in the notches.

In exemplary embodiments, the measuring member may advantageously include keying means, for example, formed by a portion of extra thickness, such as a portion of the partition that is of extra thickness when the measuring member includes such a partition.

In exemplary embodiments, the notches may extend over a portion of an inside surface of the bowl. In embodiment embodiments, a top of the bowl may include an annular rib and the notches may pass through said rib.

In exemplary embodiments, the bowl may include a portion in relief on a bottom thereof, with the measuring member, for example, the partition, coming to bear thereagainst. For example, such portion in relief may be formed by a stud that projects into a larger one of the compartments.

In exemplary embodiments, a region of the bottom of the bowl against which the partition comes to bear may preferably be planar.

In exemplary embodiments, the bowl may include a flat bottom.

Advantageously, the bowl may include an outwardly-directed collar suitable for resting on a support on a stand, for example.

Apart from its bottom, the inside surface of the bowl may be substantially spherical in shape.

In exemplary embodiments, the bowl may have a cross-section that is substantially circular. A ratio of a diameter of an opening of the bowl to a diameter of the bottom thereof may be greater than or equal to 1.5, for example.

Advantageously, a depth of the bowl may be, for example, greater than or equal to 0.5 times a width of a compartment measured perpendicularly to the partition in a midplane of the bowl. In exemplary embodiments, the depth may be 0.8 times, or even equal to the width. A relatively deep bowl may help minimize errors when reading graduations on the partition, thus making it possible to improve measurement accuracy.

In exemplary embodiments, the bowl may be made of a material that is not opaque, for example, a translucent material. The bowl may include at least one graduation, for example, on the inside surface thereof.

In exemplary embodiments, a top portion of the partition may include at least one setback.

In exemplary embodiments, the partition may preferably be configured to match substantially a shape of the inside surface of the bowl. This makes it possible to ensure that when a substance is poured into one of the compartments, flow of the substance into the other compartment is retarded sufficiently to enable the hairdresser to measure the substance.

In exemplary embodiments, the bowl, the partition, and/or the spoon may be advantageously made out of one or more materials that are inert relative to the components included in the formulation of hair dying and/or bleaching substances, and, for example, relative to polydecene oil or mono- or poly-esters of carboxylic acids, for example, a $C_8$-$C_{30}$ saturated or unsaturated monoester of carboxylic acid, and a $C_3$-$C_6$ alcohol, such as isopropyl myristate.

In exemplary embodiments, the hair care substance may have a ratio of bleaching paste to oxidizing cream lying in a range of about 1/1 to about 1/3.

Polydecenes are compounds of formula $C_{10n}H_{[(20n)+2]}$ where n may lie in a range of 3 to 9, and preferably in a range of 3 to 7. Such compounds are known under the name "polydecene" in the 1997, 7th edition of the Cosmetic, Toiletry, and Fragrance Association (CTFA) Dictionary, USA, and also by the same INCI name, both in the USA and in Europe. They are the products of hydrogenizing poly-1-decenes.

For example, mention may be made of the substance sold under the name Silkflo® 366 NF polydecene by Amoco Chemical, and the products sold under the names Nexbase® 2002 FG, 2004 FG, 2006 FG, and 2008 FG by Fortum.

Concerning mono- or poly-esters of carboxylic acids, whether linear or branching, saturated or non-saturated, such compounds may advantageously comprise at least one $C_8$-$C_{30}$ hydrocarbon chain, more particularly a $C_8$-$C_{24}$ and preferably a $C_{12}$-$C_{24}$ chain, coming from the acid or alcohol portion, and at least one $C_1$-$C_8$ chain, preferably a $C_1$-$C_6$ chain. In addition, if the carboxylic acid has a plurality of carboxylic functions, they may preferably all be esterified. Finally, it should be observed that the alcohols are preferably monofunctional alcohols.

For example, mention may be made of the esters of the following acids: oleic; lauric; palmitic; myristic; behenic; stearic; linoleic; linolenic; capric; and arachidonic; or mixtures thereof such as, in particular: oleo-palmitic; oleo-stearic; palmito-stearic, mixtures, and the like. Mention may also be made of the isopropyl diester of sebacic acid (diisopropyl sebacate), di-octyl adipate, and di-caprylyl maleate.

Preferably, the esters may be selected from those obtained from fatty acids, which may be saturated or unsaturated, preferably being saturated, having $C_{12}$-$C_{24}$ chains, and, for example, including a carboxylic group and a saturated $C_3$-$C_6$ monoalcohol that is linear or branching.

In exemplary embodiments, the bleaching substance may comprise isopropyl palmitate and/or isopropyl myristate, singly or in a mixture.

In exemplary embodiments, the inert material may be constituted by polyethylene, for example.

Exemplary embodiments of the invention may provide a kit comprising a device as defined above, together with at least two components for mixing together extemporaneously.

In exemplary embodiments, at least one of the components may be sufficiently viscous to make it possible, when poured into one of the compartments defined by the partition, for the user to measure a volume that has been poured into the compartment without any substantial quantity of the substance flowing into the other compartment by passing between the partition and the bowl.

In exemplary embodiments, one of the components may comprise one of the foregoing chemical compounds.

Exemplary embodiments of the invention may provide a method of preparing a cosmetic or dermatological preparation, the method comprising: providing a bowl as defined above, pouring a component into a compartment of the bowl, and measuring said component by reading at least one mark on the partition.

Thereafter, another component may be measured, for example, by being placed into the other compartment of the bowl, and similarly reading at least one mark on the partition.

After the components have been measured, the partition may be withdrawn and the components may be mixed together, for example, with a spoon. The spoon may be scraped, where necessary or desired, by being wiped against an edge of the tongue.

BRIEF DESCRIPTION OF THE DRAWINGS

The invention may be better understood on reading the following detailed description of a non-limiting embodiment thereof, and on examining the accompanying drawings, in which.

DETAILED DESCRIPTION OF EMBODIMENTS

Figure 1:
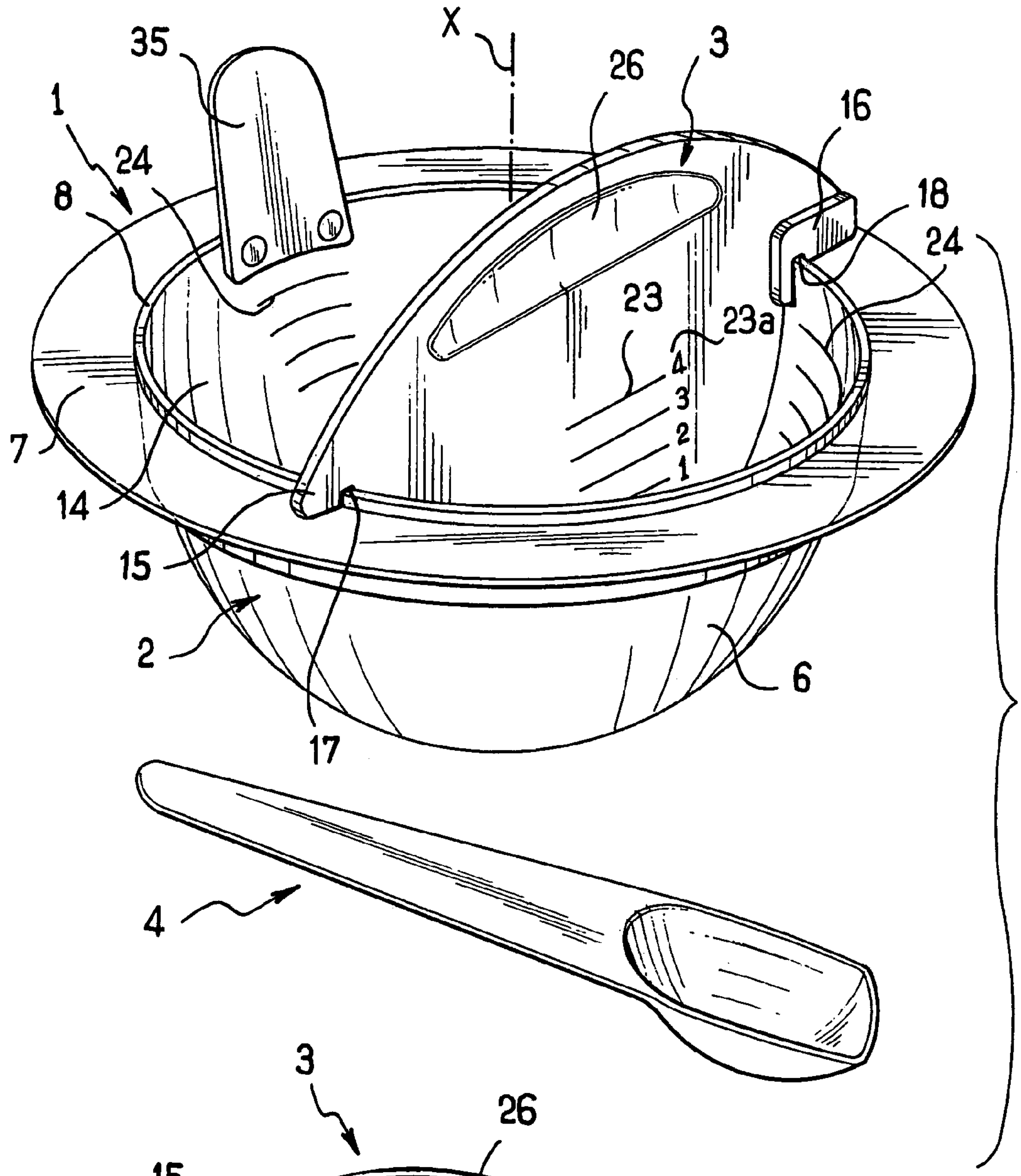
FIG. 1 is a diagrammatic perspective view of an exemplary device.

The exemplary device shown in FIG. 1 for extemporaneously mixing a plurality of components may comprise firstly an assembly 1 comprising a bowl 2 of axis X and a measuring member comprising a partition 3 secured in removable manner to the bowl 2, and secondly a spoon 4 for stirring the components to mix them together, and where appropriate or desired, for taking the resulting mixture from the bowl.

In the exemplary embodiment shown, the bowl 2 may be made of a translucent plastics material and may include a substantially flat bottom 5 and a side wall 6 that is substantially in the form of a portion of a sphere. The wall 6 may be extended radially outward at a top end thereof by a collar 7 and upward by an annular rib 8.

In the exemplary embodiment shown, the partition 3 may be generally planar and may extend substantially perpendicularly to the bottom 5, that is, vertically when the bowl 2 is held with its axis X vertical. The partition 3 may form two unequal compartments in the bowl 2, namely a relatively large compartment 10 and a relatively small compartment 11, with a volume of the large compartment 10 representing about twice a volume of the small compartment 11.

Figure 2:
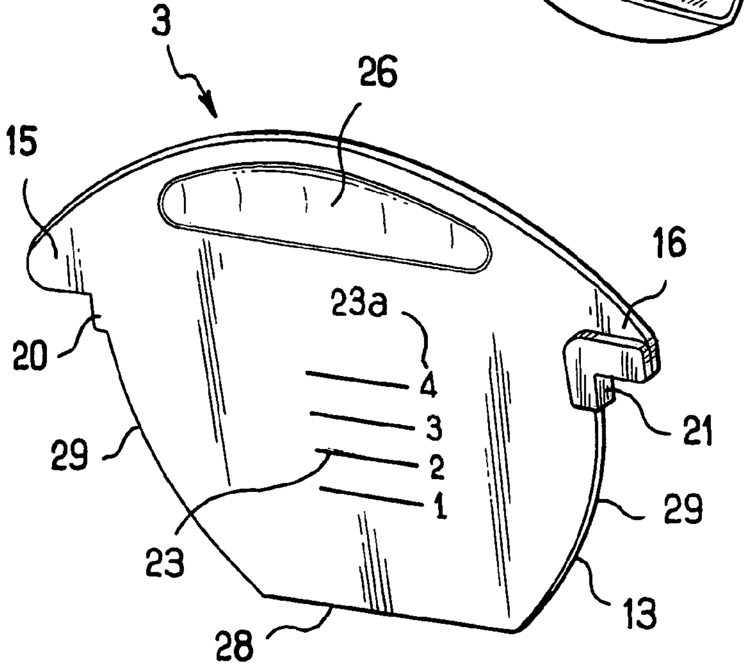
FIG. 2 shows the exemplary removable partition in isolation.

As shown in FIG. 2, the partition 3 may have in its bottom portion a profile 13 that matches substantially a shape of an inside surface 14 of the bowl, such that when the partition 3 is in place, a clearance between the partition 3 and the inside surface 14 of the bowl 2 is relatively small. The partition 3 thus may have a rectilinear bottom edge 28 and two side edges 29 that are substantially circular.

At side ends thereof, the partition 3 may include two lugs 15 and 16 arranged so as to engage in respective notches 17 and 18 of the bowl 2.

Such notches 17 and 18 may include first portions passing through the rib 8 and second portions extending over the inside surface 14 of the bowl 2 to receive respective steps 20 and 21 on the partition 3, formed under the lugs 15 and 16.

In the exemplary embodiment shown, the partition 3 may include keying means formed by the lug 16 and the associated step 21 being of extra thickness, for example, the notch 18 being substantially twice as wide as the notch 17. This may ensure that the partition 3 may be put into position in the bowl 2 only in a predefined orientation.

On each of its faces, the partition 3 may include graduations 23, for example, advantageously associated with number markings 23*a* providing information about the corresponding volume. The markings 23*a* may comprise numerals that are multiple of a base figure. The numerals may be integers that increase in a continuous manner. The graduations 23 carried by a face 31 of the partition 3 adjacent to the large compartment 10 may be used for measuring a substance put into the large compartment, and the graduations 23 carried on the other face of the partition 3 may be used for measuring a substance put into the small compartment 11.

The inside surface 14 of the bowl 2 may also include graduations 24 that likewise may be associated with number markings (not shown). The graduations 24 on the bowl 2 may serve, for example, to determine the total quantity of the mixture.

In the exemplary embodiment shown, the partition 3 may include a setback 26 in a top portion thereof to make it easier to grasp.

Figure 3:
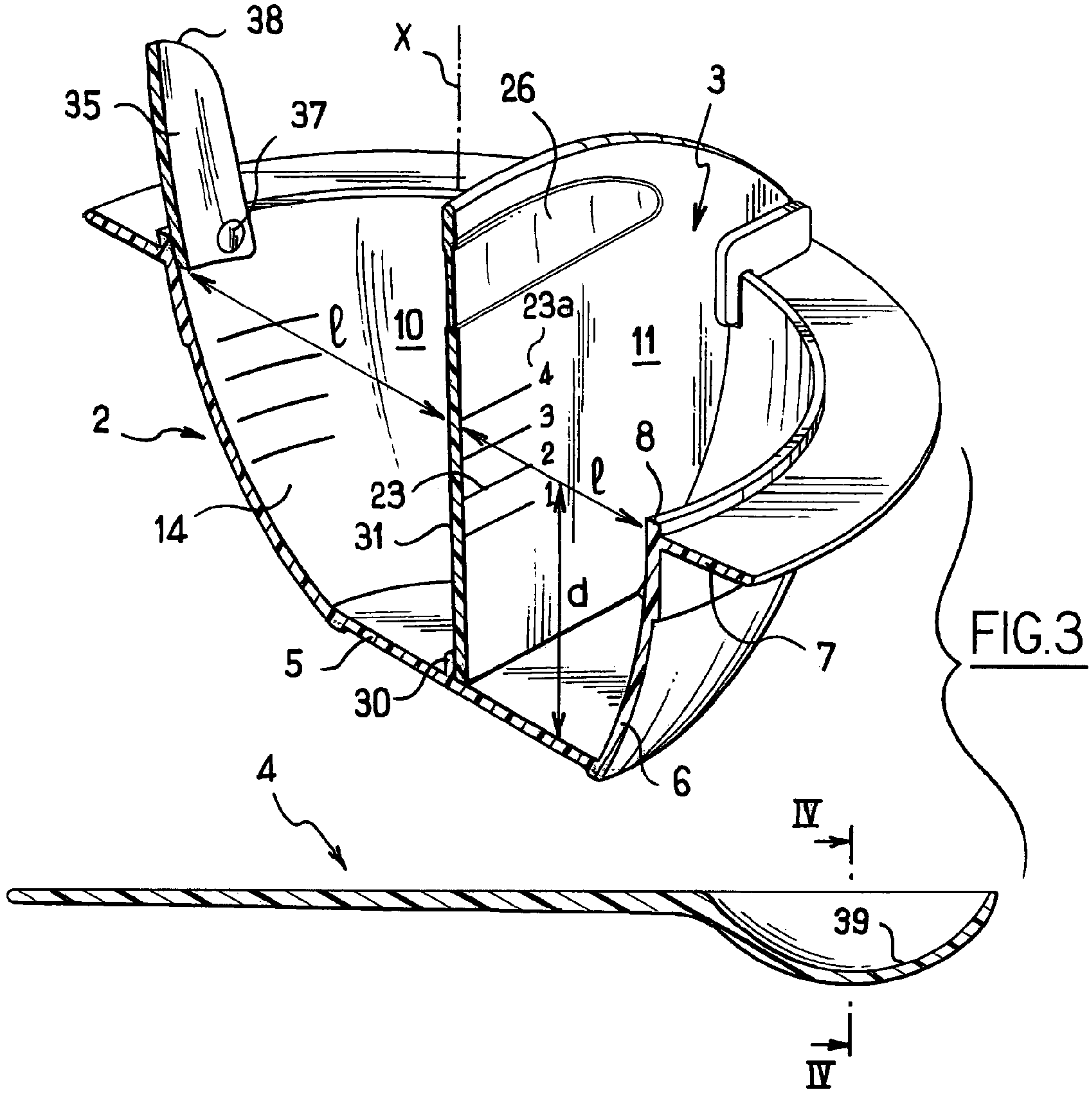
FIG. 3 shows the bowl and the spoon of the device of FIG. 1, each in cross-section on a midplane.
Figure 4:
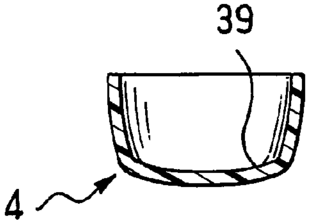
FIG. 4 is a cross-sectional view through the spoon taken along IV-IV of FIG. 3.

On the bottom thereof, the bowl 2 may include a projecting stud 30 against which the face 31 of the partition 3 may be engaged, as shown in FIG. 3.

In the exemplary embodiment shown, the bowl 2 may include a tongue 35 that extends upward and slightly inward, as shown in FIG. 3, said tongue 35 being connected to the inside surface 14 of the bowl in the large compartment 10 opposite from the partition 3, and extending symmetrically on either side of a midplane that corresponds to the section plane of FIG. 3.

In the exemplary embodiment shown, the tongue 35 may be secured to the wall 6 of the bowl by rivets 37. However, the tongue 35 may be fastened to the wall 6 in some other way. For example, the tongue 35 may be made as a single piece together with the bowl by molding a plastics material, or may be secured to a remainder of the bowl by heat-sealing, adhesive bonding, or snap-fastening.

A top portion of the tongue 35 may include an edge 38 that is adapted to a cross-sectional shape of an inside surface 39 of the spoon 4.

Thus, the user may make use of the tongue 35 for scraping the inside of the spoon 4, and the substance that is picked up by the tongue 35 may then flow back into the bowl 2.

The exemplary device may be used as follows.

With the bowl 2 being held substantially at hand-height by a support on a stand (not shown), with the collar 7 bearing thereagainst, the user, for example, a hairdresser, may insert a first component into one of the compartments defined by the partition 3 inside the bowl 2, for example, the small compartment 11, and may measure the substance that is put therein by using the corresponding graduations 23 on the partition 3, without requiring removal of the bowl 2 from its support on the stand.

Thereafter, the user may proceed to measure a second component placed into the large compartment 10, making use in a similar manner of the corresponding graduations 23 on the partition 3.

In the case when the components are relatively viscous, a component introduced into one of the compartments remains in that compartment for a sufficient length of time prior to flowing into the other compartment to allow the user time to use the other compartment for measuring purposes with an acceptable degree of accuracy.

After the components have been introduced into the bowl, the user may withdraw the removable partition 3 and proceed to mix the components by using the spoon 4. The spoon may be scraped against the edge of the tongue 35 whenever necessary or desired.

Naturally, the invention is not limited to the example described above.

For example, various modifications may be made to the exemplary embodiment shown, for example, concerning the shape of the spoon, the shape of the removable partition, or the shape of the bowl, the disposition of the tongue, or indeed the respective volumes of the large and the small compartments.

In this respect, it should be observed that it may be preferable, as shown in FIG. 3, for the depth d of the bowl 2 to be relatively large compared with the width l of each of the compartments 10 and 11 as measured perpendicularly to the partition 3 in the section plane of FIG. 3, at the level of the opening to the bowl. Such a configuration may improve measurement accuracy.

For example, the large compartment may have l≈6.5 centimeters (cm) and the small compartment 11 may have l≈4.5 cm, d may be approximately equal to 5.5 cm for an inside diameter of the bottom 5 of about 6 cm and an opening with a diameter of about 12 cm.

Throughout the description, including in the claims, the term “comprising a” should be understood as being synonymous with “comprising at least one” unless specified to the contrary.

Although the present invention herein has been described with reference to a particular exemplary embodiment, it is to be understood that such an embodiment is merely illustrative of the principles and applications of the present invention. It is therefore to be understood that numerous modifications may be made to the illustrative embodiments and that other arrangements may be devised without departing from the spirit and scope of the present invention.

What is claimed is:

1. A device for mixing at least two components, the device comprising:

a bowl configured to receive the at least two components; and a measuring member including at least one measuring mark, the measuring member being releasably fastenable to the bowl and comprising a partion arranged to form at least two compartments inside the bowl when removably fastened to the bowl;

wherein:

the bowl has a depth that is at least 0.5 times a width of a compartment measured perpendicularly to the partition in a midplane of the bowl.

2. A device according to claim 1, wherein the measuring member comprises graduations.

3. A device according to claim 2, wherein the graduations comprise numerals.

4. A device according to claim 1, wherein the partition includes graduations.

5. A device according to claim 1, wherein the partition is transparent.

6. A device according to claim 1, further including a spoon.

7. A device according to claim 6, wherein the spoon is transparent.

8. A device according to claim 6, wherein the bowl includes a tongue configured to wipe the spoon.

9. A device according to claim 8, wherein the tongue points upward.

10. A device according to claim 8, wherein the tongue points inward.

11. A device according to claim 8, wherein the tongue is fastened on an inside surface of the bowl.

12. A device according to claim 8, wherein the tongue includes a face facing toward the partition when the partition is removably fastened to the bowl.

13. A device according to claim 8, wherein the spoon includes an inside profile in cross-section that matches a shape of the tongue.

14. A device according to claim 1, wherein the at least two compartments defined by the partition are unequal.

15. A device according to claim 14, wherein the bowl includes a portion in relief on a bottom portion thereof, the portion in relief being formed by a stud projecting into a larger one of the at least two compartments.

16. A device according to claim 14, wherein the bowl includes a tongue situated in a larger one of the at least two compartments, the tongue being configured to wipe a spoon.

17. A device according to claim 1, wherein the bowl and the measuring member include co-operating portions in relief.

18. A device according to claim 17, wherein the bowl includes two notches and the measuring member includes two lugs arranged to engage in the notches.

19. A device according to claim 18, wherein the measuring member includes keying means.

20. A device according to claim 19, wherein the keying means is formed by a portion of extra thickness.

21. A device according to claim 18, wherein the notches extend over a portion of an inside surface of the bowl.

22. A device according to claim 18, wherein the bowl includes an annular rib at a top portion thereof, the notches passing through the rib.

23. A device according to claim 1, wherein the bowl includes a portion in relief on a bottom thereof, against which the measuring member bears when releasably fastened to the bowl.

24. A device according to claim 1, wherein the bowl includes a flat bottom.

25. A device according to claim 1, wherein the bowl includes an outwardly-directed collar.

26. A device according to claim 1, wherein, apart from a bottom thereof, the bowl includes an inside surface that is substantially spherical.

27. A device according to claim 26, wherein the bowl has a cross-section that is substantially circular.

28. A device according to claim 27, wherein a ratio of a diameter of an opening of the bowl to a diameter of the bottom of the bowl is at least 1.5.

29. A device according to claim 1, wherein the bowl is made of a material that is not opaque.

30. A device according to claim 29, wherein the bowl is made of a material that is translucent.

31. A device according to claim 1, wherein the bowl includes at least one measuring mark.

32. A device according to claim 31, wherein the at least one mark comprises at least one graduation.

33. A device according to claim 1, wherein a top portion of the partition includes at least one setback.

34. A device according to claim 1, wherein the partition is configured to match substantially a shape of an inside surface of the bowl.

35. A device according to claim 1, wherein the partition is arranged to divide the bowl into two unequal compartments when removably fastened to the bowl, a volume of one of the compartments lying in a range of at least 1.5 to about 2.5 times a volume of the other one of the compartments.

36. A device according to claim 1, wherein a region of a bottom of the bowl against which the measuring member comes to bear when releasably fastened to the bowl is planar.

37. A kit comprising a device as defined in claim 1, and at least two components to be mixed together extemporaneously.

38. A kit according to claim 37, wherein at least one of the components is sufficiently viscous, so that when the at least one of the components is poured into one of the compartments defined by the partition, the partition enables a user to measure a volume introduced into the bowl without any substantial quantity of the at least one of the components flowing into the other compartment by passing between the partition and the bowl.

39. A device according to claim 1, wherein the depth of the bowl is at least 0.8 times the width of a compartment measured perpendicularly to the partition in the midplane of the bowl.

40. A device according to claim 1, wherein the depth of the bowl is approximately equal to the width of a compartment measured perpendicularly to the partition in the midplane of the bowl.

41. A method of preparing at least one of a cosmetic and a dermatological preparation, the method comprising:

providing the device for mixing at least two components as defined in claim 1;

pouring a component into a compartment of the bowl; and measuring said component by reading at least one measuring mark on the measuring member.

42. A method according to claim 41, further comprising measuring another component in another compartment of the bowl by reading at least one measuring mark on the measuring member.

43. A method according to claim 41, further comprising:

after measuring the components, withdrawing the measuring member; and mixing the components together.

44. A method according to claim 43, wherein the mixing is accomplished with a spoon, further comprising scraping the spoon by wiping the spoon against an edge of a tongue associated with the bowl.

45. A device for mixing at least two components, the device comprising:

a bowl configured to receive the at least two components;

a measuring member including at least one measuring mark, the measuring member being releasably fastened to the bowl; and a spoon; wherein:

the bowl includes a tongue configured to wipe the spoon.

46. A device for mixing at least two components, the device comprising:

a bowl configured to receive the at least two components; and a measuring member including at least one measuring mark, the measuring member being releasably fastened to the bowl; wherein:

the bowl includes two notches; and the measuring member includes two lugs arranged to engage in the notches.

47. A device for mixing at least two components, the device comprising:

a bowl configured to receive the at least two components; and a measuring member including at least one measuring mark, the measuring member being releasably fastened to the bowl and comprising a partition arranged to form at least two compartments inside the bowl when removably fastened to the bowl; wherein:

the partition is arranged to divide the bowl into two unequal compartments when removably fastened to the bowl; and a volume of one of the compartments is from at least 1.5 to about 2.5 times a volume of the other compartment.

48. A method of preparing at least one of a cosmetic and a dermatological preparation, the method comprising:

providing a device for mixing at least two components, the device comprising:

a bowl configured to receive the at least two components; and a measuring member including at least one measuring mark, the measuring member being releasably fastenable to the bowl;

pouring a component into a compartment of the bowl;

measuring said component by reading at least one measuring mark on the measuring member;

after measuring the components, withdrawing the measuring member;

mixing the components together with a spoon; and scraping the spoon by wiping the spoon against an edge of a tongue associated with the bowl.

* * * * *